Feb. 23, 1960 M. CAMRAS 2,926,220

ELECTROMAGNETIC HEAD CONSTRUCTION

Filed Sept. 7. 1955 2 Sheets-Sheet 1

Inventor
MARVIN CAMRAS by Hill, Sherman, Meroni, Gross & Simpson Attys

Inventor
MARVIN CAMRAS
by Hill, Sherman, Meroni, Gross & Simpson Attys.

United States Patent Office 2,926,220

Patented Feb. 23, 1960

2,926,220

ELECTROMAGNETIC HEAD CONSTRUCTION

Marvin Camras, Glencoe, Ill., assignor to Armour Research Foundation of Illinois Institute of Technology, Chicago, Ill., a corporation of Illinois Application September 7, 1955, Serial No. 532,834

8 Claims. (Cl. 179—100.2)

This invention relates to a novel magnetic transducer head construction and particularly to such a structure having novel means for balancing stray flux.

It is an object of the present invention to provide a novel method and means for balancing stray flux in magnetic transducer heads.

It is a further object of the present invention to provide a novel hum balancing structure for magnetic transducer heads.

Still another object of the present invention is to provide a novel structure for reducing cross talk between adjacent cores of a multi-channel head.

A further object of the present invention resides in controlling the coupling of a magnetic head with respect to external fields while maintaining close coupling with a magnetic record.

Other objects, features and advantages of the present invention will be more fully apparent from the following detailed description taken in conjunction with the accompanying drawings, in which.

As shown on the drawings.

Figure 1:
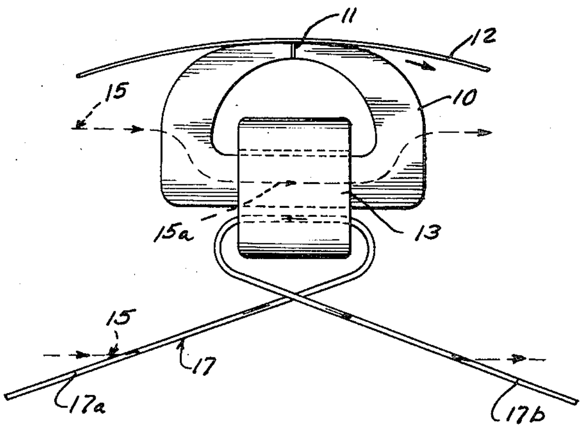
Figure 1 is a diagrammatic side elevational view of a first transducer head in accordance with the present invention.
Figure 2:
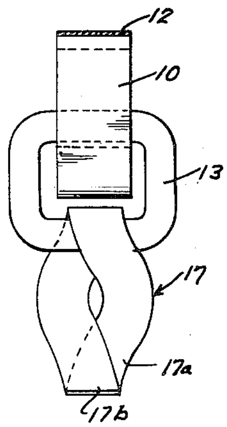
Figure 2 is a side elevational view of the structure of Figure 1.

Figures 1 and 2 illustrate a first form of the invention wherein a conventional magnetic transducer core 10 has a non-magnetic gap 11 for coupling the core to a record member 12. The core has a recording or pickup coil 13 linking the core 11 which is subject to hum pickup due to a stray field illustrated for example by the dash lines 15 which thread the coil 13 as indicated at 15*a*. In accordance with the present invention an auxiliary magnetic strip 17 preferably of high permeability material as "Mumetal" having a composition of 5% copper, 2% chromium, 77% nickel and the remainder iron and minor constituents, or "Supermalloy" composed of 5% molybdenum, 79% nickel and the remainder iron and minor constituents, is provided having oppositely directed spaced free ends 17*a* and 17*b*, connected by a loop portion in such a manner that flux picked up by the leg 17*a* is threaded through the coil 13 in a direction opposite to the flux picked up by the coil directly, which is indicated at 15*a*, to balance out or cancel the effect of the flux 15*a*. Legs 17*a* and 17*b* should be separated where they cross each other. To simplify assembly, legs 17*a* and 17*b* may be separate pieces, joined by lapping the ends thereof inside the coil 13.

Figure 3:
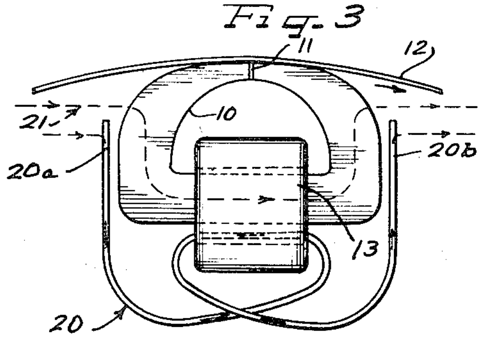
Figure 3 is a diagrammatic illustration of a modified head construction.

Figure 3 illustrates a modified construction having a core 10 and gap 11 similar to that of Figure 1 and a coil 13 which is also similar to that of Figure 1. However, in this case the magnetic hum balancing piece 20 has its end portions 20*a* and 20*b* bent to intersect more of the hum flux indicated at 21 which tends to link the main core 10. Further, the end portions 20*a* and 20*b* may be of increased area as compared to the remainder of the magnetic piece 20 so as to intercept more of the flux at the critical region.

Figure 4:
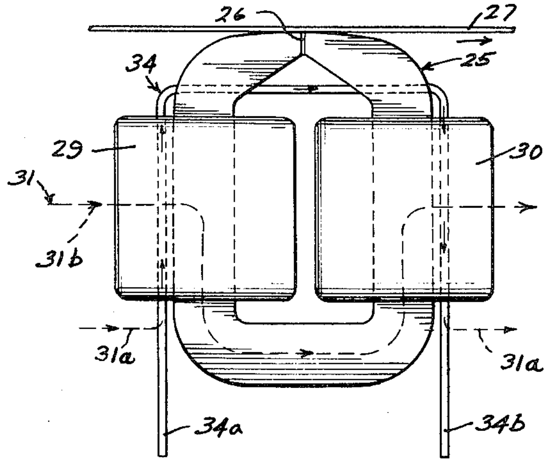
Figure 4 is a diagrammatic illustration of a further modified form of head construction in accordance with the present invention.
Figure 5:
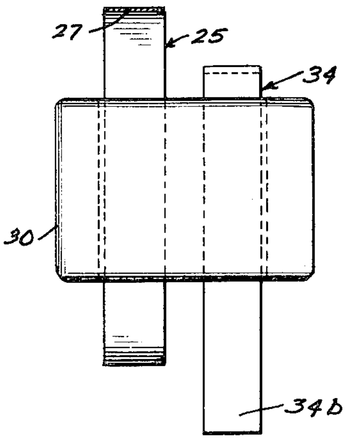
Figure 5 is an end elevational view of the structure of Figure 4.

Figures 4 and 5 illustrate a modified construction wherein a magnetic core 25 having a non-magnetic gap 26 for receiving a record medium 27 thereacross has a pair of pickup coils 29 and 30 subject to stray pickup due to a hum flux indicated by the dash lines 31. In this case, a U-shaped core member 34 is threaded through the coils 29 and 30 in such a manner that the air gap between the legs 34*a* and 34*b* of the auxiliary core is on the opposite side of the coil from the gap 26. In this manner, hum flux as indicated at 31*a* which is picked up by the auxiliary core 34 tends to thread the coils 29 and 30 in the opposite direction from the flux 31*b* which threads the main core 25.

Figure 6:
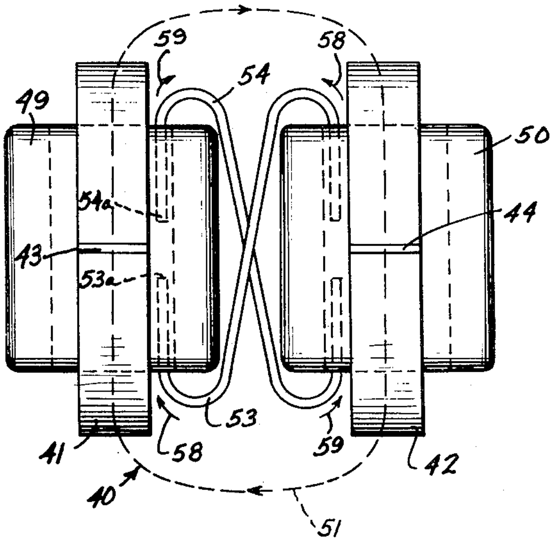
Figure 6 is a diagrammatic plan view of a multi-channel head having means for preventing cross talk.
Figure 7:
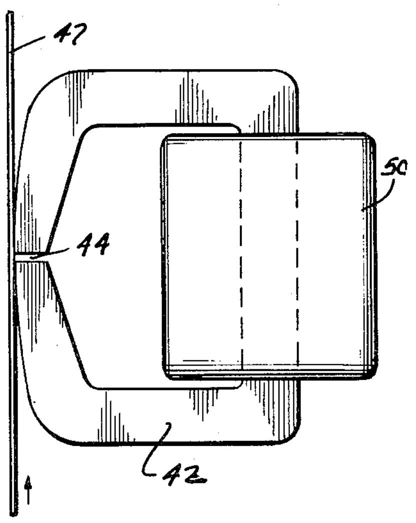
Figure 7 is an elevational view of the structure of Figure 6.

In Figures 6 and 7, a multi-channel head 40 is illustrated having a pair of cores 41 and 42 with non-magnetic gaps 43 and 44 respectively for receiving laterally adjacent channels of a magnetic record medium 47. Record or playback windings 49 and 50 respectively, are provided for establishing recording flux at the gaps 43 and 44, or for producing a voltage due to the threading of a signal flux in the respective cores. For example, in recording, the winding 49 may be energized and this causes a desired recording field across the gap 43 but also sets up a stray flux as indicated at 51 linking the coil 50. To oppose this stray flux 51, a pair of auxiliary magnetic pieces 53 and 54 are provided having end portions 53*a* and 54*a* in the respective coils 49 and 50 and connecting opposite ends of the coils so as to produce fluxes as indicated by the arrows 58 and 59 opposing the stray flux 51 in the winding 50.

Figure 8:
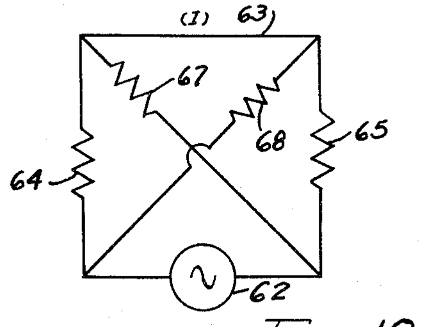
Figure 8 illustrates an electrical equivalent to the magnetic circuit involved in Figure 6.
Figure 9:
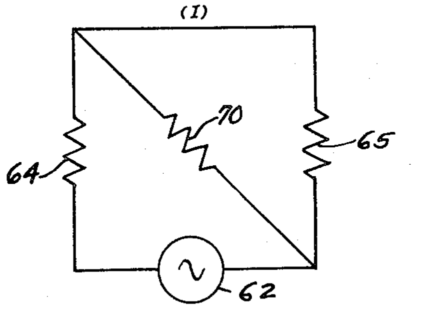
Figure 9 is a view similar to Figure 8 but illustrating the situation with only a single magnetic piece between the adjacent cores of the multi-channel head.

The electrical analogy for this situation is illustrated in Figure 8 wherein the voltage source 62 corresponds to the magnetomotive force from the energized head, for example due to the energization of winding 49, the branch 63 has a current corresponding to the stray flux in the second head along the path represented by electrical resistances 64 and 65, the stray flux being reduced to zero by proper adjustment of the path through the balancing auxiliary pieces 53 and 54 represented by the resistances 67 and 68. The network of Figure 8 corresponds to a Wheatstone bridge arrangement so that it will be understood that the current in the branch 63 may be reduced to zero by proper adjustment of the resistances 67 and 68. Figure 9 illustrates the corresponding situation where there is only a single auxiliary magnetic path between the two windings represented by resistance 70. In this case, current (I) can be reduced by resistance 70 but not perfectly balanced out as with the circuit of Figure 8 corresponding to the embodiment of Figures 6 and 7.

It will be understood that the auxiliary pieces in Figs. 1 to 7 may be adjustable in size or position to provide the desired cancellation of the stray flux, or alternatively the adjustment or size of the auxiliary pieces may be predetermined for satisfactory reduction of unwanted pickup.

Adjustment of the length or area of the ends such as 17*a*, 20*a*, or 34*a* protruding from the coils is particularly effective in securing a balance.

Experimental results indicate that for the head of Figures 1 and 2 with a single core oriented in a standard field for maximum hum pickup, without the auxiliary piece 17 the relative hum voltage output was about 35 db, while with the auxiliary piece 17 in place adjusted for best balance, the hum voltage pickup in the same field when the head was oriented for maximum hum pickup was 16½ db.

With the head of Figures 4 and 5, without the auxiliary piece 34, the maximum relative hum voltage pickup in a standard field was 26 db while with the auxiliary piece the maximum relative pickup was 6 db.

In the head of Figures 1 and 2, the coil 13 was 3000 turns ½ inch long while the core 10 was 3/16 inch wide by .010 inch thick. In the head of Figures 4 and 5, the pole pieces were 3/32 of an inch wide by .014 inch thick, and the coils each had 3000 turns and were ½ inch long.

Figure 10:
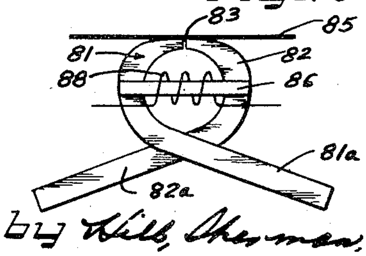
Figure 10 shows a further modified head construction.

In Figure 10, the head has a pair of core legs 81 and 82 with a gap 83 between one pair of free ends of the legs coupling the head to a magnetic record member 85. A bridge member 86 overlaps intermediate portions of legs 81 and 82 and completes a loop magnetic circuit including gap 83. Pickup winding 88 is wound on bridge 86 and stray flux linking winding 88 directly is opposed by stray flux picked up by end 82*a* of leg 82 and channeled through bridge 86 and then through end 81*a* of leg 81. Ends 81*a* and 82*a* are spaced where they cross as in Figure 1.

It will be apparent that many modifications and variations may be effected without departing from the scope of the novel concepts of the present invention.

I claim as my invention:

1. A magnetic transducer head comprising a core having a non-magnetic gap for receiving a magnetic record medium thereacross, and a coil linking said core, the improvement characterized by auxiliary magnetic means forming a magnetic circuit linking said coil and channeling stray flux through said coil in the opposite direction from stray flux linking said coil by means of a path separate from said auxiliary magnetic circuit.

2. A magnetic transducer head comprising a core having a non-magnetic gap for receiving a magnetic record medium thereacross, and a coil linking said core, the improvement characterized by an auxiliary magnetic piece forming a magnetic circuit linking said coil and disposed to channel stray flux through said coil in the opposite direction from flux linking said coil by means of a path separate from said auxiliary magnetic circuit, said auxiliary piece comprising an elongated member extending through said coil and having opposite free ends crossing in spaced relation and extending in opposite directions generally along the axis of said coil.

3. A magnetic transducer head comprising a core having a non-magnetic gap for receiving a magnetic record medium thereacross, and a coil linking said core, the improvement characterized by an auxiliary magnetic piece forming a magnetic circuit linking said coil and disposed to channel stray flux through said coil in the opposite direction from flux linking said coil by a path separate from said auxiliary magnetic circuit, said auxiliary piece being of generally U-shape and having legs extending through a pair of coils on said core and terminating at the opposite side of said core from said gap therein.

4. A magnetic head construction comprising a magnetic core having a non-magnetic gap, winding means linking said core, an auxiliary magnetic piece having a portion thereof extending within said winding means and having a further portion thereof joining with said first portion on a reverse bend and extending generally parallel with said first portion and channeling stray flux through said winding means in the opposite direction from stray flux linking said winding means by a path spaced from said auxiliary magnetic piece.

5. A multi-channel head comprising a pair of adjacent cores having non-magnetic gaps and having winding means linking the respective cores, and a pair of auxiliary magnetic members having end portions extending into the respective windings and crossing so as to produce magnetic fluxes in one of the windings due to energization of the other opposing the fluxes linking between said winding means along paths separate from said auxiliary magnetic members.

6. A multi-channel head assembly comprising a first core having a flux sensitive element associated therewith responsive to flux linking said first core, a second core adjacent said first core and having a flux sensitive element associated therewith responsive to flux linking said second core, and auxiliary magnetic members in spaced crossed relation between said first and second cores and having an effect on the flux sensitive elements when linked by a stray flux opposite to the effect on the flux sensitive elements of the stray flux linking said cores by paths separate from said auxiliary magnetic members.

7. A magnetic transducer head comprising a core having a non-magnetic gap for receiving a magnetic record medium thereacross, and a flux sensitive element coupled to said core, the improvement characterized by an auxiliary magnetic means forming a magnetic circuit linking said flux sensitive element channeling stray flux through said flux sensitive element in the opposite direction from stray flux linking said flux sensitive element along a path disposed in spaced relation to said auxiliary magnetic circuit.

8. A multi-channel head comprising a pair of adjacent cores having non-magnetic gaps and having flux sensitive means in proximity to the respective cores, and a pair of auxiliary magnetic members having portions extending between the respective flux sensitive means and crossing so as to produce magnetic fluxes in one of the flux sensitive means associated with one of the cores due to energization of the other core opposing the flux linking between said other core and said one flux sensitive means along paths separate from said auxiliary magnetic members.

References Cited in the file of this patent

UNITED STATES PATENTS

| | | |
|---|---|---|
| 2,428,449 | Camras | Oct. 7, 1947 |
| 2,538,405 | Zenner | Jan. 16, 1951 |
| 2,584,984 | Camras | Feb. 12, 1952 |